Aug. 22, 1961   J. J. ZELENITZ   2,997,264
TREE HOLDER
Filed May 15, 1959
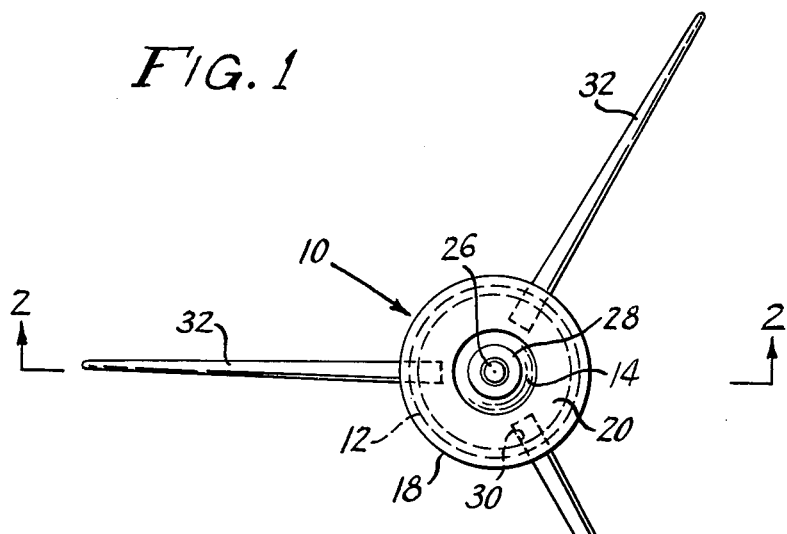
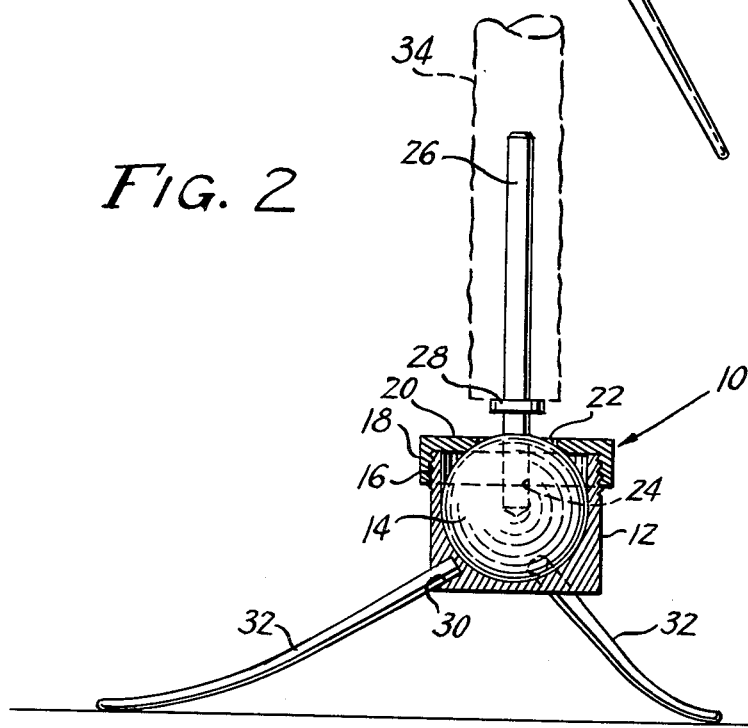
INVENTOR.
JOSEPH J. ZELENITZ
BY
*Gustav Miller*
ATTORNEY

United States Patent Office 2,997,264
Patented Aug. 22, 1961

2,997,264
TREE HOLDER
Joseph J. Zelenitz, Box 287, Blaine, Ohio
Filed May 15, 1959, Ser. No. 813,462
1 Claim. (Cl. 248—48)

This invention relates to Christmas tree holders, and it particularly relates to a tree holder of the adjustable type.

The ordinary type of tree holder can only hold the tree in its normal upright position; consequently, if the tree is not inherently straight, it will remain crooked when set up in position. Furthermore, in many instances, the best branches on the tree are at the bottom and must be cut off before the tree could be set in place with the ordinary holders. In addition, with the ordinary type holders, the size of the tree is limited to the size of the holder.

It is one object of the present invention to overcome the above difficulties by providing a tree holder which is easily adjustable to compensate for any crookedness in the tree.

A further object of this invention is to provide a tree holder that has readily detachable legs and that can be stored in a small amount of space.

Another object of the present invention is to provide a tree holder of the aforesaid type which permits any tree to be utilized with its full foliage.

Another object of the present invention is to provide a tree holder of aforesaid type which is adaptable to any size tree.

Other objects of the present invention are to provide an improved tree holder, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which:

FIG. 1 is a top plan view of a tree holder embodying the present invention.

FIG. 2 is a side view, partly in section and partly in elevation, of the device of FIG. 1.

Referring in greater detail to the drawing wherein similar reference characters refer to similar parts, there is shown a tree holder, generally designated 10, comprising a hollow, cylindrical housing 12 wherein the interior is concavely curved at the bottom to snugly receive the lower portion of a ball 14, the housing 12 acting as a socket for the ball 14.

The upper end of the housing 12 is open and is defined by an externally-threaded upper portion 16. This upper portion 16 is releasably engaged with an internally-threaded peripheral flange 18 depending from a cap 20 having a central aperture 22 positioned to receive the upper portion of the ball 14.

The ball 14 is provided with an internal bore 24 within which is positioned the lower end of a rod 26 extending upwardly therefrom. The rod 26 is provided with a flange 28 slightly spaced above the ball 14.

The housing 12 is provided with three equidistantly-spaced, angularly-extending sockets 30 in each of which is detachably positioned a supporting leg 32.

In use, the cap 20 is loosened and the stem 34 of a tree is first drilled at its base to form a bore, and is then placed on the tree holder with the rod 26 extending into the bore. The tree trunk, in this position, rests on the supporting flange 28 at the bottom portion of rod 26. If the tree is crooked or needs adjustment for any other reason, this is accomplished by rotating ball 14 within housing 12 until the tree is in the desired position. The cap 20 is then screwed down to hold the ball 14 rigidly in place. Since the entire tree trunk is set above the holder 10, there is never any necessity for cutting off any of the lower branches.

If desired, water or the like may be provided in the housing 12 and the rod 26 can also be made hollow and filled with water. Outlet holes could then be provided in the hollow rod as passages for the water, so that the tree may remain moist and thus be more fire-resistant.

The provision of removable legs 32 makes it easier to pack the holder into a small compact unit for storage.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

A tree holder comprising a hollow cylindrical housing having an upper end defined by an externally-threaded rim, a concavely curved lower inner wall in said housing, a flat exterior bottom wall on said housing providing a peripherally thickened area adjacent the periphery of said flat bottom wall, a cap threadedly engaged on said rim portion, a central aperture in said cap, a plurality of supporting legs for said housing removably extending into the thickened peripheral bottom area of said housing in angularly extending apertures spaced equally apart about the bottom of said housing below said concavely curved inner wall, a ball in said housing, said ball being frictionally seated against the concavely curved inner wall of said housing, a rod of smaller diameter than said aperture in said cap extending from said ball through said open end of the housing and through said central aperture in said cap, said rod having a supporting flange thereon spaced from but adjacent to said ball for abutting an apertured tree trunk telescopically seated on said rod, the wall of the cap defining said center aperture acting as an abutment to frictionally engage said ball when said cap is screwed down upon said housing.

References Cited in the file of this patent
UNITED STATES PATENTS

| | | |
|---|---|---|
| 1,997,870 | Merril | Apr. 16, 1935 |
| 2,548,351 | Coombs | Apr. 10, 1951 |
| 2,893,668 | Applegate | July 7, 1959 |